United States Patent

[15] 3,640,500

Rogers

[45] Feb. 8, 1972

[54] GATE VALVE WITH IMPROVED SEAL ASSEMBLY

[72] Inventor: William A. Rogers, 746 West 28th Street, San Pedro, Calif. 90731

[22] Filed: Dec. 30, 1970

[21] Appl. No.: 102,825

Related U.S. Application Data

[62] Division of Ser. No. 793,790, Jan. 24, 1969, Pat. No. 3,561,731.

[52] U.S. Cl. ....................................251/326, 137/DIG. 1
[51] Int. Cl. ............................................F16k 3/02
[58] Field of Search............................251/328, 326, DIG. 1

[56] References Cited

UNITED STATES PATENTS

| | | | |
|---|---|---|---|
| 382,469 | 5/1888 | Hawthorne et al. | 137/630.22 |
| 2,720,219 | 10/1955 | Grove et al. | 137/630.19 |

*Primary Examiner*—Arnold Rosenthal
*Attorney*—Christie, Parker & Hale

[57] ABSTRACT

A valve having a body member defining a chamber with first and second ports, and a closure member movable in the chamber over the first port between open and closed positions to control flow between the ports. A resilient seal is mounted on either the body member or the closure member to seal the valve by bearing against a mating face of the other member when the valve is closed. A backup element is slidably mounted in the valve chamber to provide continuous confinement for the seal as the closure member is moved away from the closed position toward the open position. The backup element fits against the mating face member when the valve is opened to define a substantially continuous smooth surface in sliding contact with the seal and against which the seal is compressed. The smooth surface formed by the mating face member and the backup element is broken only by a line joint or seam between the member and element, and the seal passes easily over this joint without distorting or tending to extrude. After the closure member has retracted toward the open position sufficiently to pass the seal over the joint so the seal now bears entirely on the backup member, the closure member is further drawn past the first port to permit flow through the valve.

3 Claims, 14 Drawing Figures

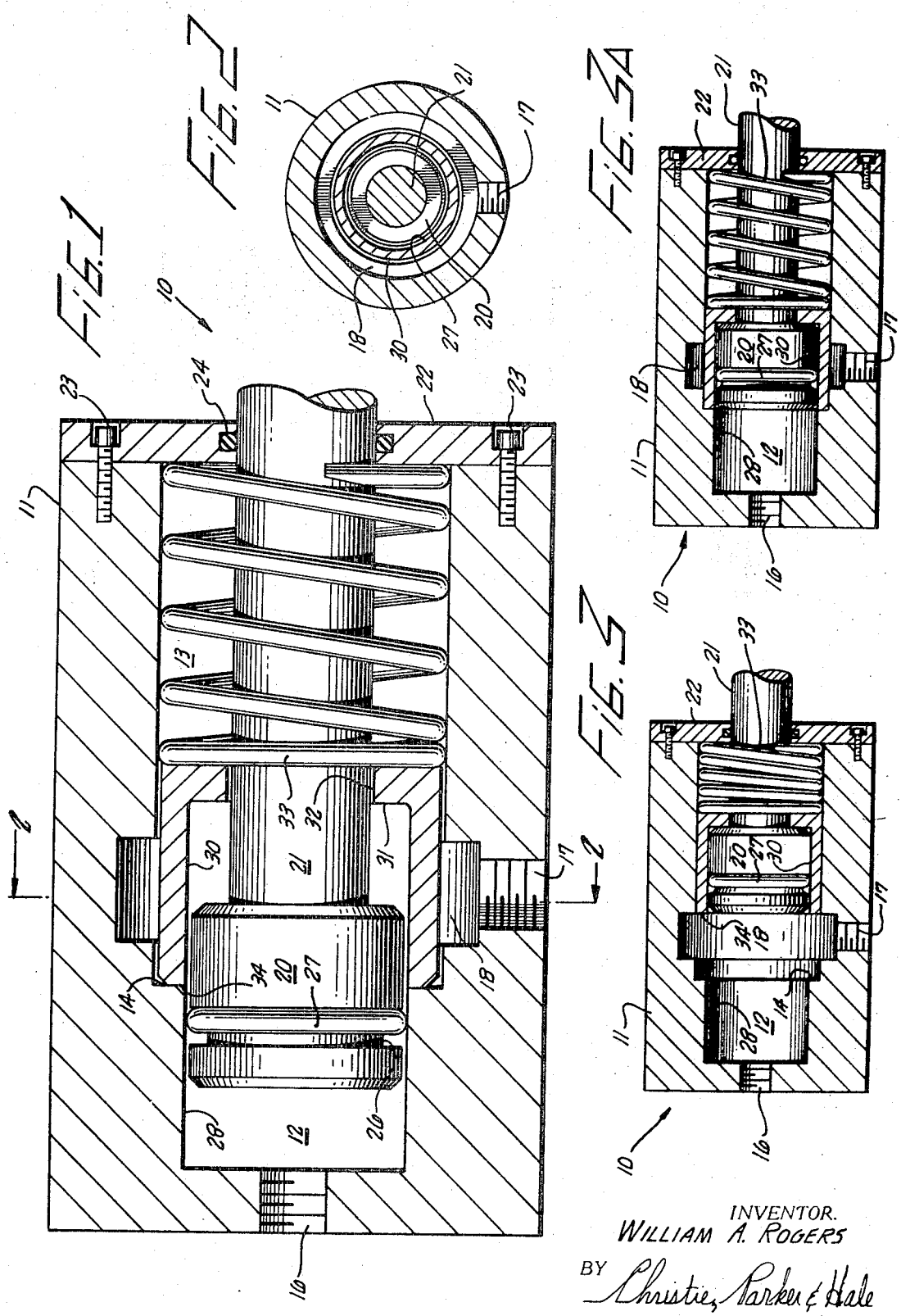

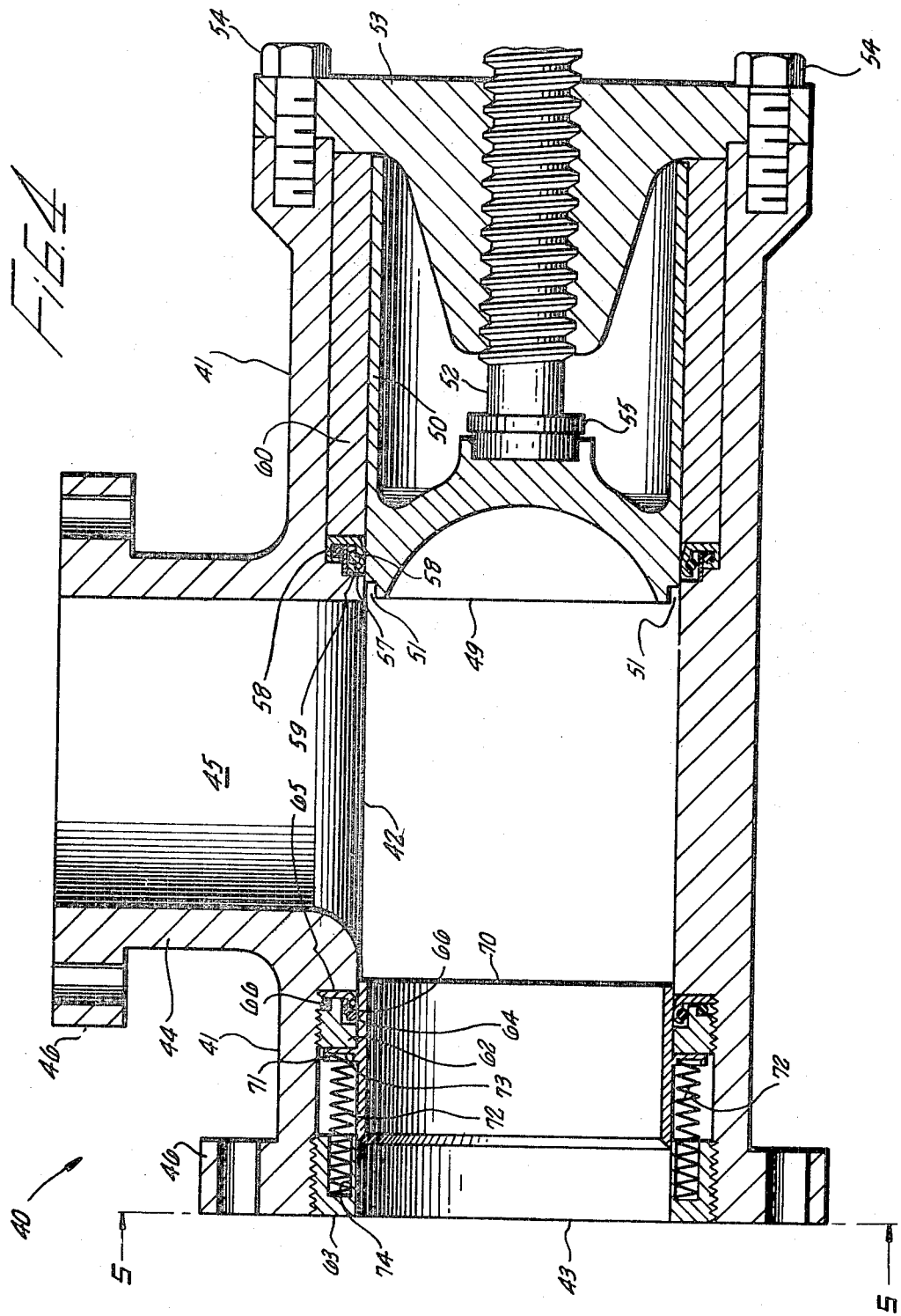

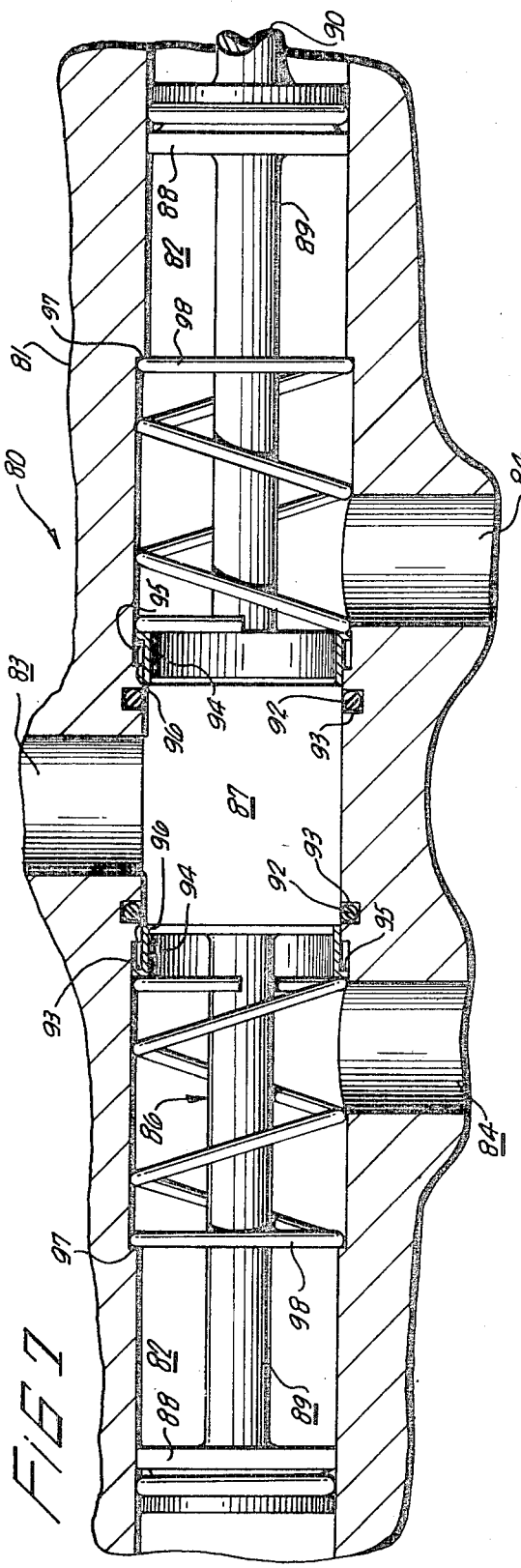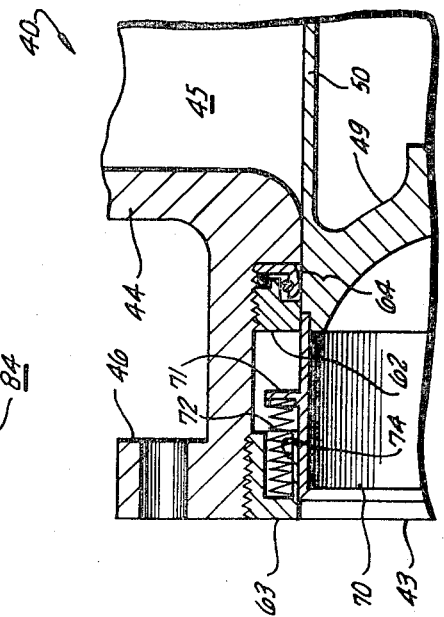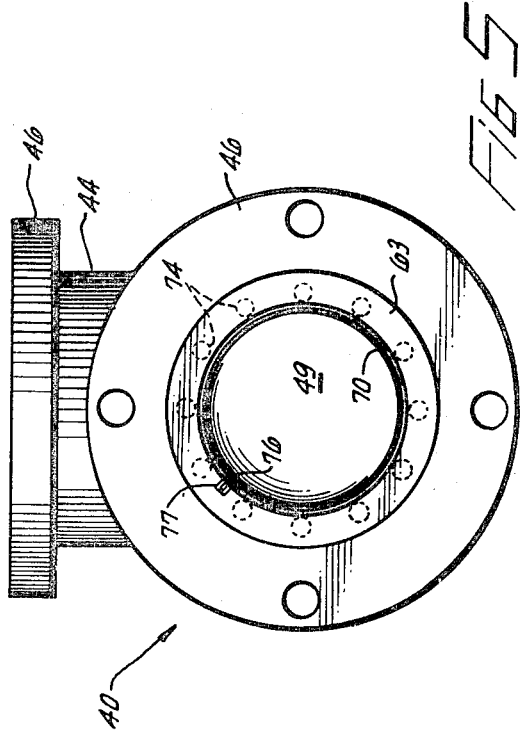

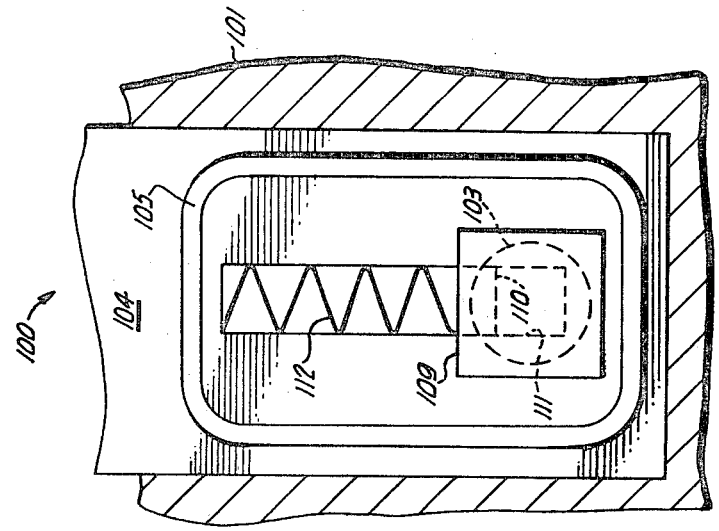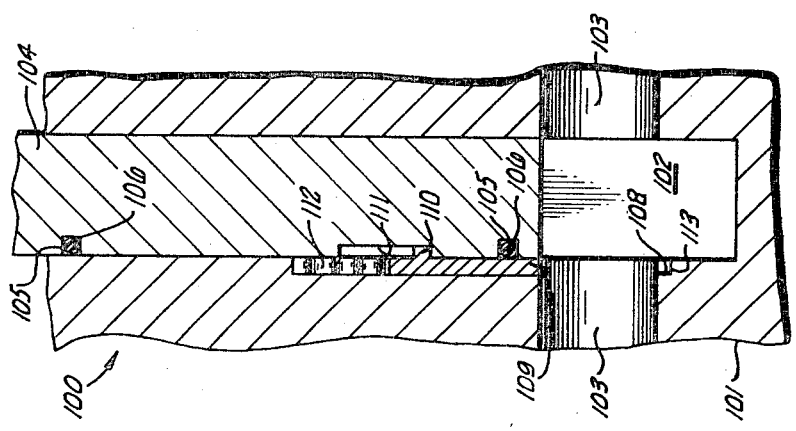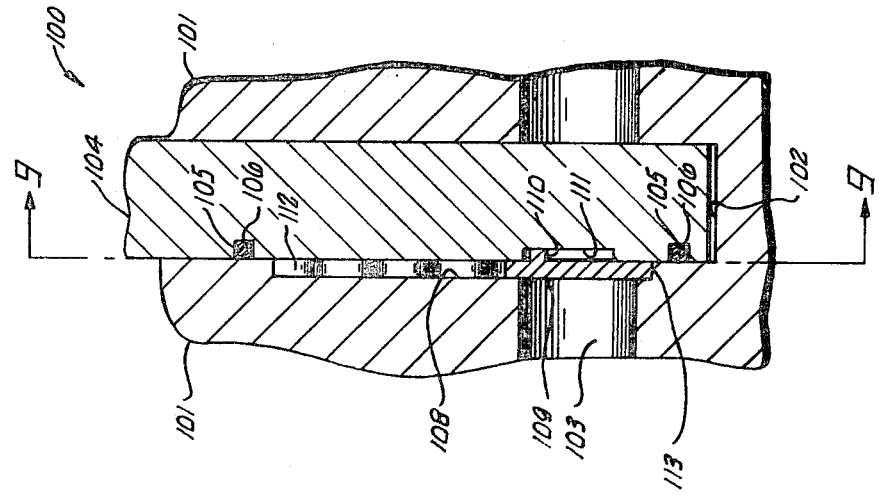

PATENTED FEB 8 1972
3,640,500
SHEET 5 OF 5
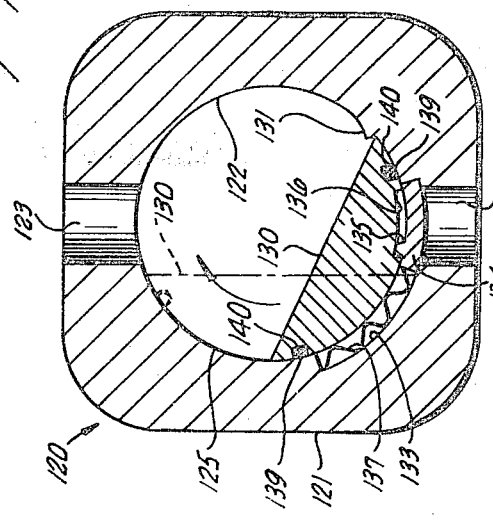
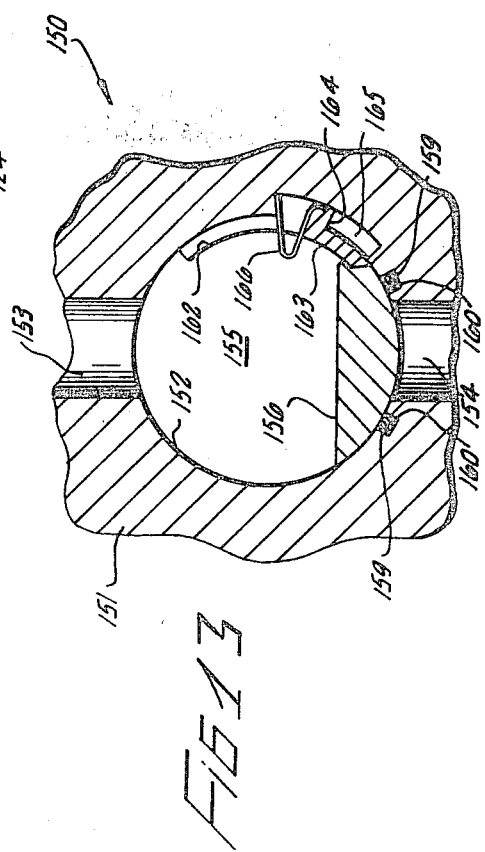
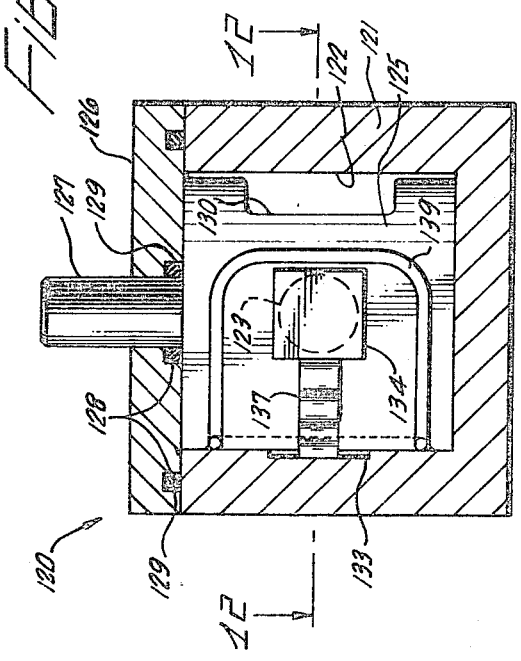

GATE VALVE WITH IMPROVED SEAL ASSEMBLY

CROSS REFERENCE TO RELATED APPLICATION

This is a division of my copending application Ser. No. 793,790, filed Jan. 24, 1969, now U.S. Pat. No. 3,561,731.

BACKGROUND OF THE INVENTION

A problem common to many different types of valves is to provide a tight long-life seal which prevents leakage flow when the valve is closed. The sealing arrangement should be dependable over many cycles of valve operation, and ideally should be economical to manufacture and essentially simple and economical to maintain. In conventional valves, sealing is accomplished by either a resilient seal (such as an O-ring, lobed ring, or similar elastomeric element) or by providing a very close lapped fit between a movable closure member and a body member of the valve. Both of these approaches have deficiencies which prevent the achievement of the aforementioned design goals in valves intended for high-pressure service, or which are used in difficult applications such as controlling the flow of cryogenic fluids.

In a typical spool valve, for example, a piston is slidably mounted in a bore defined by a body of the valve. Ports open into the bore, and the piston moves over at least one of the ports to control flow through the valve. The piston and valve are very precisely machined and lapped to provide a fit which is sufficiently close that flow is essentially blocked when the piston covers the port. Wear of the moving parts, however, will eventually destroy the close fit to cause leakage, and this wear is accelerated when the valve controls flow of fluids which contain abrasive impurities. In high-pressure applications, the valve body may expand sufficiently to create leakage paths between the piston and body. Another problem is that lapped valves are subject to seizing when subjected to temperature variations. Finally, lapped valves are expensive to manufacture and maintain.

The problems inherent in a lapped piston valve can sometimes be solved by using a relatively loose-fitting piston and providing an inexpensive resilient seal to close the resulting annular space between the piston and the bore-defining wall of the valve body. Such ring-shaped seals are available in a variety of different cross sections, and are seated in a groove (on the piston, for example) to bear against and be confined in the groove by the opposed surface of the bore along which it slides. A resilient seal offers good sealing and long life when it bears against a smooth and unbroken bore surface. Seal integrity, however, is jeopardized when the bore surface has a discontinuity such as a transverse port over which the seal must pass as the piston is moved between open and closed valve positions.

As the resilient seal is moved over the port, the confining or squeezing action of the bore wall is lost, and the seal tends to distort and extrude into the bore wall discontinuity formed by the port. The seal may also be pinched or abraded as the piston moves over the port, and the resulting cutting or tearing can cause leakage and makes the seal less resistant to extrusion out of the groove into the discontinuity. As a result of these problems, soft or resilient seals are not usable in most high-pressure valves, and an expensive lapped valve must be selected.

The problem of cross section distortion arising from extrusion of the seal is especially severe in valves used to control flow of cryogenic fluids. The elastomeric materials from which resilient seals are formed tend to harden at very low temperatures, and the seal is then very susceptible to cracking, tearing or breaking when subjected to even a relatively slight cross section distortion arising from extrusion into a discontinuity in the seal-confining surface of the valve body.

The invention herein disclosed is an improved seal assembly which overcomes the problems commonly encountered with resilient seals in valves and similar devices. The invention contemplates the use of a backup element which is movably mounted in the valve, and which mates with a discontinuous seal-confining surface to define a substantially continuous surface which bears on the seal and is broken by only a line-contact joint or seam into which the seal does not tend to extrude. The seal is thus maintained under constant "squeeze" for all positions of the valve piston or closure member, and cross section distortion arising from seal extrusion is avoided. This valve design is simple and economical to manufacture, and provides low-maintenance long-life service in difficult high-pressure or cryogenic applications without the expense of providing a lapped fit between moving members of the valve. Overhaul or repair normally involves only replacement of the soft or resilient seal, and is quickly and economically accomplished. The extensive teardown, major component replacement, and machining needed to overhaul a lapped fit valve is thus avoided.

SUMMARY OF THE INVENTION

This invention relates to an improved gate valve which includes a valve body member having a slot therein defining a chamber. A pair of aligned and spaced-apart ports open into opposite sides of the chamber. A plate forming a closure gate member is linearly slidable in the body member slot between an open position in which fluid can flow through the chamber between the ports, and a closed position in which the closure member is disposed between the ports to block flow therebetween. The closure member is slidable transversely with respect to a direction of flow between the ports when the valve is open.

A resilient seal is mounted on one of the members to be in sliding contact with the other member as the closure member is moved away from the open position. A backup element is slidably disposed in the chamber, and is arranged to move into abutment with said other member as the closure member approaches the closed position. The backup element is configured to define in conjunction with said other member a substantially continuous smooth surface in sliding contact with the seal, and against which the seal is compressed as the closure member is moved from the closed position toward the open position.

Preferably, the gate valve includes a resilient means arranged to urge the backup element toward a position in which the substantially continuous smooth surface is defined. In one form, the backup element is a plate slidably fitted in a channel in said other member, the plate having a lug extending therefrom to engage said one member and thereby move the backup element plate as the valve is opened. The resilient seal extends peripherally around the backup element plate and associated resilient means when the valve is closed.

BRIEF DESCRIPTION OF THE DRAWINGS

FIG. 1 is a cross-sectional elevation of a piston valve with a moving seal and backup sleeve according to the invention, the valve being shown in a closed position;

FIG. 2 is a reduced scale view on line 2—2 of FIG. 1;

FIG. 3 is a reduced scale view similar to FIG. 1 and showing the valve in an open position;

FIG. 3A is a view similar to FIG. 3 and showing the valve components just as the valve begins to open;

FIG. 4 is a sectional elevation of another style of valve using a backup sleeve and stationary seal according to the invention;

FIG. 5 is a view on line 5—5 of FIG. 4;

FIG. 6 is a fragmentary cross-sectional elevation of the valve shown in FIG. 4 with the valve in a closed position;

FIG. 7 is a fragmentary sectional elevation of a balanced spool valve;

FIG. 8 is a fragmentary sectional elevation of a gate valve using a seal assembly according to the invention and shown in a closed position;

FIG. 9 is a view on line 9—9 of FIG. 8;

FIG. 10 is a sectional elevation similar to FIG. 8 and showing the gate valve in an open position;

FIG. 11 is a sectional elevation of a plug valve using a seal assembly according to the invention;

FIG. 12 is a view on line 12—12 of FIG. 11; and

FIG. 13 is a sectional view of another form of a plug valve using a stationary seal.

DESCRIPTION OF THE PREFERRED EMBODIMENTS

The improved seal assembly of this invention is useful in and will be described with reference to valves which incorporate either stationary or movably mounted resilient seals. FIGS. 1–3 show a simple form of a piston valve 10 which embodies the invention. Valve 10 includes a body member 11 having a stepped bore with a first portion 12 and an enlarged second portion 13, the bore defining an annular shoulder 14 which separates the first and second bore portions.

A threaded opening defining a first port 16 extends through body member 11 and opens into first bore portion 12. A second threaded opening 17 extends transversely through the valve body member into an enlarged annular second port 18 in the second bore portion. Conventional inlet and outlet lines and fittings (not shown) are connected to the threaded openings in the valve body to conduct a fluid through the valve bore.

A valve piston or closure member 20 makes a loose slip fit in first bore portion 12 of the valve body, and has an actuating shaft 21 extending therefrom through a cover plate 22 which closes the end of the bore opposite first port 16. The cover plate is secured to the valve body by screws 23, and carries an O-ring seal 24 bearing against actuating shaft 21. A conventional actuating mechanism (not shown) such as a lever, handwheel, hydraulic or pneumatic cylinder, or the like, is attached to the actuating shaft to reciprocate the closure member in the bore. Alternatively, the closure member or actuating shaft can be spring loaded toward the closed position to form a pressure relief valve which is flow actuated and does not require external actuation.

Closure member 20 has an annular groove 26 and a resilient seal 27 is seated in the groove. Seal 27 can have any of the conventional cross sections used in this type of seal, and is shown in the drawings as being of the usual O-ring type. When closure member 20 is in a closed position between ports 16 and 18 as shown in FIG. 1, seal 27 bears on and is confined in groove 26 by a cylindrical inner wall 28 of the body member which defines first bore portion 12. Flow between the ports is thus blocked when the valve is closed by the closure member and resilient seal.

A backup sleeve 30 makes a slip fit in second bore portion 13, and has an inwardly extending annular wall 31 at one end with an opening 32 through which actuating shaft 21 of the closure member extends. A resilient means such as a compression coil spring 33 is disposed around the actuating shaft between wall 31 of the backup sleeve and cover plate 22 of the valve body. The spring urges the backup sleeve to the left as seen in FIG. 1 to abut an end 34 of the sleeve against annular shoulder 14 of the valve body.

The inside diameter of hollow backup sleeve 30 corresponds to the inside diameter of first bore portion 12 in the valve body. The inner wall of the backup sleeve thus forms a smooth extension of the first bore portion as shown in FIG. 1. End 34 of the sleeve is configured to abut and seat on annular shoulder 14 so the substantially continuous smooth surface defined by the sleeve and wall 28 is broken only by a line contact joint or seam between shoulder 14 and end 34.

Actuating shaft 21 is moved to the right as seen in FIG. 1 to shift the closure member into an open position in which flow is permitted through the bore between ports 16 and 18. In the initial motion of the actuating shaft, the closure member is retracted into the backup sleeve while the sleeve is held against annular shoulder 14 by spring 33 as shown in FIG. 3A. During this retraction of the closure member, resilient seal 27 passes smoothly over the line contact joint or seam between the annular shoulder and backup sleeve. Extrusion or cross-sectional distortion of the seal is prevented because the seal is continuously and uniformly confined, and is not exposed to the discontinuity in the bore formed by second port 18.

When the closure member is fully retracted into the backup sleeve, further motion of the actuating shaft retracts both the closure member and backup sleeve away from second port 18 as shown in FIG. 3. There is thus in effect a lost motion coupling between the closure member and backup sleeve, the two components being independent until the closure member is fully seated within the sleeve. The sleeve and closure member can be fully retracted into second bore portion 13 away from port 18 to open the valve to its fullest extent (see FIG. 3), or sleeve 30 can be positioned partially over the second port to regulate flow through the valve to a rate less than the maximum flow rate.

When piston valve 10 is to be returned to a closed position, actuating shaft 21 is moved toward port 16, and coil spring 33 returns the backup sleeve to its seated position against annular shoulder 14 while the closure member and resilient seal are still fully retracted within the sleeve. After the sleeve has seated on the shoulder, further motion of the actuating shaft extends the closure member out of the backup sleeve across the line joint between the sleeve and shoulder. When the actuating shaft is in a fully closed position as shown in FIG. 1, the resilient seal is positioned beyond this line contact joint to bear against and be confined by body member wall 28 which defines the first bore portion.

The backup sleeve thus serves as a buffer member which forms a smooth extension of the first bore portion, the closure member and resilient seal being drawn into this extended bore when the valve is open. The seal is fully isolated from the surface discontinuity created by port 18, and is continuously confined under constant squeeze in groove 26. The problems of seal extrusion are thereby avoided, and seal distortion is prevented. Pinching or cutting of the seal is also avoided as the valve is opened and closed because the seal slides on a substantially continuous smooth surface which is broken only by the line joint between the backup sleeve and annular shoulder. The seal is also protected from impact and abrasion from the flowing fluid stream when the valve is partially or fully open.

The concept of the invention is equally useful in valves using a stationary seal, and this form of the invention is shown in piston valve 40 in FIGS. 4–6. Valve 40 is a right-angle valve having a body member 41 with a central chamber or cylindrical bore 42 having an axial first port 43 at one end and a lateral extension 44 defining a second port 45. Annular bolt flanges 46 are provided to couple external conduits (not shown) to the valve body member.

A valve piston or closure member 49 has a cylindrical skirt 50 making a slip fit in bore 42 of the valve body member. The leading end of the closure member is grooved to define an annular recess 51 around its periphery. A closure member actuating shaft 52 is threaded through a cover plate 53 secured by bolts 54 to an end of the valve body member opposite first port 43. The inner end of the threaded actuating shaft is coupled to the center of closure member 49 by a ball bearing 55 which isolates the closure member from the rotation of the actuating shaft. A hand wheel or power-operated shaft-rotating device (not shown) is connected to the outer end of the actuating shaft.

A conventional annular seal 57 is mounted in bore 42 of the body member to bear against closure member 49. A pair of conventional cable springs 58 separated by a continuous flat annular band 59 are positioned within the seal to urge the legs of the seal against the body member and closure member. A hollow cylindrical retainer 60 forms part of the valve body member, and is positioned between seal 57 and cover plate 53 to hold the seal in place, the inner surface of the retainer defining a portion of cylindrical bore 42. The valve is shown in a fully open position in FIG. 4 with closure member 49 retracted into retainer 60 to permit free flow between ports 43 and 45 through the valve body.

The chamber of valve 40 is enlarged at the left end (as seen in FIG. 4) of the body member 41, and is threaded to receive a seal-retaining ring 62 and a spring-retaining ring 63. The inside diameters of rings 62 and 63 correspond to the inside diameter of retainer 60, and the rings thus define a portion of cylindrical bore 42 in which the closure member moves to open and close the valve. An annular, generally J-shaped resilient main seal 64 is disposed in the body member between retaining ring 62 and an annular shoulder 65 on the body member. A pair of flat wire helical cable springs 66 are positioned between ring 62 and seal 64 on opposite sides of an axially extending annular rib 67 on ring 62. The outer spring 66 urges seal 64 against shoulder 65, and the inner spring urges the seal radially inwardly toward the axis of cylindrical bore 42.

A backup element or sleeve 70 makes a slip fit in bore 42 against rings 62 and 63, and against body member 41 adjacent shoulder 65. The backup sleeve has an outwardly extending annular flange 71 secured thereto which abuts ring 62 to limit the inward travel (to the right in FIG. 4) of the backup sleeve. A plurality of compression coil springs 72 are seated in circular recesses 73 and 74 in rings 62 and 63 respectively, and the springs urge flange 71 against ring 62 to position the backup sleeve as shown in FIG. 4. A key 76 is secured to the backup sleeve and mates with a longitudinally extending slot 77 (see FIG. 5) to prevent rotation of the sleeve which might tend to unseat springs 72.

With closure member 49 positioned as shown in FIG. 4, the valve is fully open and fluid can flow freely between ports 43 and 45. SEal 57 prevents leakage of fluid past the retracted closure member when the valve is open. To close the valve, actuating shaft 52 is rotated to drive the closure member across second port 45 to a closed position as shown in FIG. 6. When the valve is closed, resilient main seal 64 bears on the periphery of the closure member to prevent fluid leakage between the valve body member and closure member.

As the closure member is being moved toward the fully closed position, the inner end of backup sleeve 70 seats in annular recess 51 of the closure member, and the sleeve forms a smooth extension of the closure member surface, the total surface being broken only by the line joint between the sleeve and closure member. Continued motion of the closure member toward the fully closed position (to the left in FIGS. 4 and 6) moves the backup sleeve across resilient seal 64 toward the position shown in FIG. 6. The seal is continuously confined by the backup sleeve and closure member in the annular space defined by the seal-retaining ring 62 and shoulder 65, and is thereby prevented form extruding into the cylindrical bore of the valve. Pinching or cutting of the seal is also avoided as the line contact joint between the closure member and backup sleeve passes smoothly over the seal as the valve is closed.

When the valve is opened by rotating actuating shaft 52 to retract the closure member, springs 72 force the backup sleeve to slide over seal 64 and to follow the closure member until flange 71 abuts ring 62. Continued retraction of the closure member then opens the valve to permit flow between the ports. The seal is thus continuously supported and confined for any position of the closure member, and is protected from abrasion or tearing.

The seal structure just described with reference to valve 40 is shown in another form in FIG. 7 which illustrates a three-port fully balanced spool valve 80. The valve includes a body member 81 having a cylindrical bore 82 therethrough. An inlet port 83 opens laterally into the bore, and a pair of longitudinally spaced outlet ports 84 open into the bore across from and on opposite sides of the inlet port.

A piston assembly 86 is slidably mounted in the bore, and includes a central flow control closure member 87 and a pair of force-balancing pistons 88 connected to opposite sides of the closure member by a pair of shafts 89. A control shaft 90 extends out of the valve to an actuating mechanism (not shown) which reciprocates the closure member in the bore to permit flow between the inlet port and either one of the outlet ports.

A pair of O-ring resilient seals 92 are mounted in annular grooves 93 in the valve body member on opposite sides of inlet port 83. The seals close the annular clearance space between the body member and closure member 87 when the piston assembly is in a closed position as shown in FIG. 7. A pair of backup elements or sleeves 94 are positioned on opposite sides of the closure member and make a slip fit in bore 82.

The end of each backup sleeve 94 remote from the closure member defines a radially outwardly extending flange 95. Bore 82 is enlarged in diameter adjacent each of the outlet ports to make a slip fit over flanges 95, and to define an annular shoulder 96 between each seal 92 and the outlet ports. The ends of the enlarged portions of the bore remote from the closure member also define annular shoulders 97.

A pair of compression coil springs 98 are positioned in the enlarged portions of the body member bore between shoulders 97 and flanges 95 on the backup sleeves. The ends of the closure member are slightly reduced in diameter to fit within the ends of the backup sleeves so the sleeves abut the closure member and only line joints appear in the combined peripheral surfaces of the abutted components. Springs 98 urge the backup sleeves against the closure member as shown in FIG. 7. Each sleeve is free to move with the closure member away from the inlet port against the force of the associated coil spring, and can also move toward the inlet port to cover seal 92 when flange 95 abuts shoulder 96.

In operation, piston assembly 86 is moved to the left or right as seen in FIG. 7 to permit flow between the inlet port and the one of the outlet ports. As the closure member is moved away from the inlet port, one of the backup sleeves follows the closure member to confine and cover the resilient seal which would otherwise be exposed by the retracting piston. Extrusion of the seal is thereby prevented, and abrasion or pinching is also avoided as the seal "sees" no more than the line joint between the backup sleeve and closure member.

The invention is not limited to piston-type valves, and is equally useful in a guillotine-type sliding gate valve 100 as shown in FIGS. 8-10. This valve has a body member 101 with a chamber-defining slot 102 and a pair of ports 103 extending through the body member into communication with the slot. A valve gate or closure member 104 is slidably mounted in slot 102 to seal the ports from each other when the valve is in a closed position as shown in FIG. 8. Leakage is prevented by a resilient seal 105 seated in a generally rectangular groove 106 in the closure member and bearing against the opposed surface of the body member.

Slot 102 in the body member is increased in width adjacent one of the ports to define a rectangular channel 108, and a backup element or plate 109 is slidably mounted in this channel between the closure member and body member. The backup plate has a lug or flange 110 extending from one side thereof into an elongated channel 111 formed in a face of the closure member opposite channel 108. A resilient member such as a wave spring 112 is disposed in channel 108 to act against the backup plate and urge it across the adjacent port to seat on a shoulder 113 in the end of channel 108.

When the valve is opened by raising closure member 104 to permit flow between the ports, resilient seal 105 passes smoothly over the line joint defined by the abutted backup plate and shoulder 113. The surface of the backup plate thus forms a smooth, substantially continuous extension of the slot surface against which the closure member and seal bear. As the closure member is raised, flange 110 is engaged by the bottom of channel 111 and the backup plate is thereafter raised with the closure member until the valve is fully open as shown in FIG. 10.

When the valve is returned to a closed position, the backup plate again seats in the position shown in FIG. 8 before the gate reaches the bottom of the slot. The seal is thus continuously confined and supported by either the backup plate or the slot-defining surface of the body member, and extrusion or abrasion of the seal is avoided as explained above. The invention can of course also be adapted to a gate valve using a stationary seal mounted in the valve body member.

A moving seal plug valve 120 incorporating the invention is shown in FIGS. 11–12. The plug valve has a body member 121 with a cylindrical bore 122, and a pair of ports 123 and 124 extend through the body member into the bore. A cylindrical plug or valve closure member 125 makes a rotating slip fit within bore 122, and is held within the body member by a cover plate 126. A valve control shaft 127 is secured to and extends upwardly from the closure member through cover plate 126. A pair of conventional O-ring seals 128 are disposed in grooves 129 in the cover plate to prevent leakage between the cover plate, control shaft and body member.

A central portion 130 of closure member 125 is cut away to have a cross section in the shape of a circular segment as shown in FIG. 12. The closure member is shown in a closed position in FIG. 12, but can be rotated away from this position to permit unobstructed flow through the valve between the ports. The closure member is shown in phantom line in FIG. 12 to indicate its open position. A stop 131 extends into bore 122 from the body member to limit the travel of the closure member in the closed position.

Bore 122 in the body member is enlarged on opposite sides of port 124 to define a curved channel 133 opposite central portion 130 of the closure member. A curved backup element or plate 134 shaped as an annular segment is slidably mounted in channel 133 to extend over port 124 when the valve is closed as shown in FIG. 12. A lug 135 extends inwardly from he backup plate into a channel 136 in central portion 130 of the closure member. A spring 137 is mounted in channel 133 to urge the backup plate into a seated position as shown in FIG. 12.

A resilient seal 139 is seated in a groove 140 in the face of the closure member, and bears against the body member around port 124 and channel 133 to prevent leakage between the closure member and body member when the valve is in a closed position. When the valve is opened, seal 139 moves smoothly over the line joint between the body member and backup plate 134. Continued rotation of the closure member causes the end of channel 136 to engage lug 135 and rotate the backup plate away from port 124 into the opposite end of channel 133. Free flow through the valve between the ports is then permitted.

The opposite sequence occurs when the valve is closed, the backup plate being returned to its seated position by spring 137 before seal 139 passes off of the backup plate onto the body member. The seal is thus continuously confined and supported by the backup plate and body member which cooperate to define a smooth and substantially continuous surface bearing against the seal.

The invention is equally applicable to a plug valve 150 with a stationary seal as shown in FIG. 13. This valve is generally similar to valve 120 just described in that it has a body member 151 with a cylindrical bore 152 and a pair of opposed ports 153 and 154 extending through the body member into the bore. A cylindrical plug closure member 155 with a cutaway sector-shaped central portion 156 is fitted in the bore to be rotatable between closed and open positions as shown in solid and phantom lines respectively in FIG. 13.

A stationary resilient seal 159 is mounted in a groove 160 in the body member to bear against the central portion of the closure member to prevent leakage when the valve is closed. The cylindrical portions of the closure member above and below the sector-shaped central portion define a channel 162 in which a curved backup plate 163 is slidably mounted, the plate being shaped as an annular segment. A lug 164 extends outwardly from the backup plate into a groove 165 in the body member. A resilient means such as a leaf spring 166 or any other conventional spring is disposed between the body member and backup plate to urge the backup plate against the closure member in a seated position as shown in FIG. 13.

When the closure member is rotated into the open position, spring 166 forces the backup plate to follow the closure member until the backup plate has covered seal 159, and lug 164 has abutted the end of groove 165. Continued rotation of the closure member then places the valve in a fully open position in which fluid flows freely through the valve between the ports. As in the other types of valves described above, the resilient sleeve is continuously supported and confined by either the backup plate or the closure member, and extrusion of the seal is thereby prevented. The backup plate and closure member cooperate to define a smooth and substantially continuous surface or shield bearing against the seal and broken only by the line joint between these components.

The invention has been described with reference to several different styles of valves to show that it is useful in many different types of seal applications in which seal extrusion, distortion, abrasion and pinching are a problem. The invention finds particular utility in high-pressure valves, or in valves handling low-temperature fluids which tend to harden a resilient seal and make it more vulnerable to chipping or breakage. The invention, however, is not limited to these specific applications, and is useful in any device employing a resilient seal which is to be protected against extrusion and other damage.

For example, the invention is well suited for use in pressure relief valves which may be of the flow-actuated type. The invention is especially valuable in controlling flow of abrasive seal-eroding fluids because the seal is isolated from the flowing fluid stream. Similarly, the seal is protected from the high-velocity fluid stream which can quickly erode a soft seal in a high-pressure valve, or in lower pressure applications where the valve is only slightly opened in a metering position. Secondary hydraulic systems used to handle leakage flow in conventional valves are also eliminated by the improved seal-protecting configuration.

The invention has been illustrated in terms of various valves having a backup member which is spring urged toward a seated position, but other arrangements are practical and feasible. For example, the backup member can be coupled to an external actuator which is timed or synchronized to maintain a proper relationship between the seal, closure member and backup element for any valve position. This arrangement is especially suitable for large valves which are positioned by power actuators rather than handwheels or levers. Other variations and applications of the basic improvement will suggest themselves to those concerned with the maintenance of a high-integrity seal between relatively movable members.

What is claimed is:

1. An improved gate valve, comprising:

a valve body member having a slot therein defining a chamber, and a pair of spaced-apart aligned ports opening into opposite sides of the chamber;

a plate forming a closure gate member disposed in the chamber to be linearly slidable in the slot between an open position in which a fluid can flow through the chamber between the ports and a closed position in which the closure member is disposed between the ports to block flow therebetween, the closure member being slidable transversely with respect to a direction of flow between the ports when the valve is open;

a resilient seal mounted on one of the members to be in sliding contact with the other member as the closure member is moved away from the closed position, the seal being confined between the members to seal the valve when the closure member is in the closed position; and a backup element slidably disposed in the chamber and arranged to move into abutment with said other member as the closure member is moved toward the closed position, the backup element being configured to define in conjunction with said other member a substantially continuous smooth surface in sliding contact with the seal and against which the seal is compressed as the closure member is moved from the closed position toward the open position.

2. The gate valve defined in claim 1 and further comprising resilient means arranged to urge the backup element toward a position in which said substantially continuous smooth surface is defined.

3. The gate valve defined in claim 2 in which the backup element is a plate slidably fitted in a channel in said other member, the plate having a lug extending therefrom to engage said one member and thereby move the backup element plate as the valve is opened, the resilient seal extending around the backup element plate and associated resilient means when the valve is closed.

* * * * *